(12) United States Patent
Ou

(10) Patent No.: US 11,566,602 B2
(45) Date of Patent: Jan. 31, 2023

(54) METHOD AND APPARATUS FOR CONTROLLING NOISE OF MULTIPLE WIND TURBINES

(71) Applicant: BEIJING GOLDWIND SCIENCE & CREATION WINDPOWER EQUIPMENT CO., LTD., Beijing (CN)

(72) Inventor: Fashun Ou, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 400 days.

(21) Appl. No.: 16/477,384

(22) PCT Filed: Sep. 29, 2018

(86) PCT No.: PCT/CN2018/108668
§ 371 (c)(1),
(2) Date: Jul. 11, 2019

(87) PCT Pub. No.: WO2019/218575
PCT Pub. Date: Nov. 21, 2019

(65) Prior Publication Data
US 2021/0332793 A1 Oct. 28, 2021

(30) Foreign Application Priority Data
May 18, 2018 (CN) .......................... 201810482517.7

(51) Int. Cl.
*F03D 9/00* (2016.01)
*H02P 9/04* (2006.01)
(Continued)

(52) U.S. Cl.
CPC .......... *F03D 7/0296* (2013.01); *F03D 7/028* (2013.01); *F03D 7/0224* (2013.01);
(Continued)

(58) Field of Classification Search
CPC ...... F03D 7/0224; F03D 7/0279; F03D 7/028; F03D 7/0296; F03D 7/048; F05B 2260/96;
(Continued)

(56) References Cited

U.S. PATENT DOCUMENTS 6,688,841 B1 * 2/2004 Wobben .................. F03D 7/048
415/1
7,902,689 B2 * 3/2011 Kinzie .................... F03D 7/028
290/55
(Continued)

FOREIGN PATENT DOCUMENTS

CN 101907062 A 12/2010
CN 102562447 A 7/2012
(Continued)

OTHER PUBLICATIONS

Influence of Wind Direction on Noise Emission and Propagation From Wind Turbines; Issued Nov. 21-23, 2012.
(Continued)

*Primary Examiner* — Tulsidas C Patel
*Assistant Examiner* — Thomas K Quigley

(57) ABSTRACT

A method and an apparatus for controlling noise of multiple wind turbines. The method includes: determining a noise-influencing sector of each of the multiple wind turbines, based on positions of the multiple wind turbines and a position of a noise-influencing site; acquiring a current wind direction; determining whether there is at least one wind turbine of the multiple wind turbine under the current wind direction operating in the noise-influencing sector; and lim-
(Continued)

iting output power of the at least one wind turbine, in a case that the determination is positive.

16 Claims, 6 Drawing Sheets

(51) Int. Cl.
*F03D 7/02* (2006.01)
*F03D 7/04* (2006.01)
(52) U.S. Cl.
CPC .......... *F03D 7/0276* (2013.01); *F03D 7/048* (2013.01); *F05B 2260/96* (2013.01); *F05B 2270/101* (2013.01); *F05B 2270/1033* (2013.01); *F05B 2270/301* (2013.01); *F05B 2270/321* (2013.01); *F05B 2270/327* (2013.01); *F05B 2270/328* (2013.01); *F05B 2270/333* (2013.01); *F05B 2270/335* (2013.01)
(58) Field of Classification Search
CPC ........ F05B 2270/101; F05B 2270/1033; F05B 2270/321; F05B 2270/327; F05B 2270/328; F05B 2270/333; F05B 2270/335
See application file for complete search history.

(56) References Cited

U.S. PATENT DOCUMENTS

| | | | | |
|---|---|---|---|---|
| 8,100,647 | B2* | 1/2012 | Godsk | F03D 7/042 416/1 |
| 8,128,361 | B2* | 3/2012 | Dawson | F03D 7/042 416/1 |
| 8,215,907 | B2* | 7/2012 | Kooijman | F03D 7/0296 416/1 |
| 8,426,994 | B2* | 4/2013 | Nielsen | F03D 7/048 290/44 |
| 10,697,431 | B2* | 6/2020 | Hammerum | F03D 7/0296 |
| 2009/0295165 | A1 | 12/2009 | Giguere et al. | |
| 2010/0074748 | A1* | 3/2010 | Godsk | F03D 7/024 416/1 |
| 2010/0133818 | A1* | 6/2010 | Kinzie | F03D 7/0296 290/44 |
| 2010/0143117 | A1 | 6/2010 | Xiong | |
| 2010/0143119 | A1* | 6/2010 | Kooijman | F03D 7/0212 416/1 |
| 2010/0158687 | A1* | 6/2010 | Dawson | F03D 7/0292 416/31 |
| 2011/0175356 | A1* | 7/2011 | Nielsen | F03D 7/048 290/44 |
| 2011/0223006 | A1* | 9/2011 | Loh | F03D 7/0224 415/118 |
| 2012/0025530 | A1* | 2/2012 | Kinzie | F03D 7/048 290/44 |
| 2012/0027591 | A1* | 2/2012 | Kinzie | F03D 7/0296 416/1 |
| 2012/0139254 | A1* | 6/2012 | Attia | F03D 13/20 290/55 |
| 2013/0140818 | A1 | 6/2013 | Matesanz Gil | |
| 2013/0154263 | A1 | 6/2013 | Attia | |
| 2013/0209220 | A1 | 8/2013 | Nielsen | |
| 2014/0377065 | A1 | 12/2014 | Matesanz | |
| 2016/0032892 | A1 | 2/2016 | Herrig et al. | |
| 2016/0032893 | A1* | 2/2016 | Herrig | F03D 7/048 290/44 |
| 2016/0032894 | A1* | 2/2016 | Ambekar | F03D 7/048 416/1 |
| 2016/0341180 | A1* | 11/2016 | Lee | F03D 7/0224 |
| 2017/0356421 | A1 | 12/2017 | Petitjean et al. | |
| 2019/0040843 | A1* | 2/2019 | Gray | F03D 7/048 |
| 2019/0154000 | A1* | 5/2019 | Hammerum | F03D 7/0296 |
| 2019/0203694 | A1* | 7/2019 | Gupta | F03D 7/0276 |
| 2020/0362818 | A1* | 11/2020 | Barlas | F03D 7/0296 |

FOREIGN PATENT DOCUMENTS

| | | |
|---|---|---|
| CN | 103244351 A | 8/2013 |
| EP | 2216549 A2 | 8/2010 |
| EP | 2599996 A1 | 6/2013 |
| JP | 2003-097414 A | 4/2003 |
| WO | 2017/000956 A1 | 1/2017 |

OTHER PUBLICATIONS

First Australian Examination Report Application No. 2018400527; dated Jun. 12, 2020.
The International Search Report dated Jan. 25, 2019; PCT/CN2018/108668.
Extended European Search Report dated Dec. 21, 2020; Appln. No. 18893345.1.
Indian First Examination Report dated Dec. 22, 2020; Appln. No. 201917026464.

* cited by examiner

METHOD AND APPARATUS FOR CONTROLLING NOISE OF MULTIPLE WIND TURBINES

This application is the national phase of International Application No. PCT/CN2018108668, titled "METHOD AND APPARATUS FOR CONTROLLING NOISE OF MULTIPLE WIND TURBINES", filed on Sep. 29, 2018, which claims the priority to Chinese Patent Application No. 201810482517.7, titled "METHOD AND APPARATUS FOR CONTROLLING NOISE OF MULTIPLE WIND TURBINES", filed on May 18, 2018 with the National Intellectual Property Administration of People's Republic of China, which is incorporated herein by reference in its entirety.

FIELD

The present disclosure relates generally to the technical field of wind power generation, and in particular, to a method and an apparatus for controlling noise of multiple wind turbines.

BACKGROUND

In recent years, construction of wind farms is getting more and more close to residential areas with development of wind power industry. As a result, an impact of noise generated in operation of a wind turbine on residents cannot be ignored.

There are two main kinds of the noise generated in operation of wind turbine. One is mechanical noise generated in the operation of wind turbine, for example, yaw noise and cooling fan noise of a converter. The other is aerodynamic noise of blades of the wind turbine, that is, noise due to high-speed airflow around the blades in rotation. To deal with the above two kinds of noise generated by the wind turbine that has been built, following methods are generally utilized. For the mechanical noise, seal of the wind turbine is strengthened, a brake of the yaw system is reformed, or a silencer is installed on a cooling fan of a converter. For the aerodynamic noise of blades, a saw-tooth tailing edge may be installed on the blades, or output power of the wind turbine may be reduced from a control perspective.

The conventional method for controlling noise from the control perspective is inflexible, apt to result in a great loss in power generation, and hard to meet requirements on various customizations.

SUMMARY

A method for controlling noise of multiple wind turbines is provided according to one aspect of an embodiment of the present disclosure. The method may include: determining a noise-influencing sector of each of the multiple wind turbines, based on positions of the multiple wind turbines and a position of a noise-influencing site; acquiring a current wind direction; determining whether at least one wind turbine of the multiple wind turbines under the current wind direction operates in the noise-influencing sector of the at least one wind turbine; limiting output power of the at least one wind turbine, in a case that the determination is positive; and continuing to acquire the current wind direction again, in a case that the determination is negative; where the output power of the at least one wind turbine reaches a rated power and is then increased, after limiting the output power of the at least one wind turbine, or output power of another wind turbine of the multiple wind turbines which is not limited reaches a rated power and is then increased, while limiting the output power of the at least one wind turbine, so as to compensate a power loss in limiting the output power of the at least one wind turbine.

An apparatus for controlling noise of multiple wind turbines is provided according to another aspect of an embodiment of the present disclosure. The apparatus may include: a sector determination module, configured to determine a noise-influencing sector of each of the multiple wind turbines based on positions of the multiple wind turbines and a position of a noise-influencing site; a first acquisition module, configured to acquire a current wind direction; a sector judgment module, configured to determine whether there is at least one wind turbine of the multiple wind turbines under the current wind direction operating in the noise-influencing sector; and a power regulation module, configured to limit output power of the wind turbine, in a case that there is the at least one wind turbine operating in the noise-influencing sector of the at least one wind turbine; where the first acquisition module acquires the current wind direction again, in a case that there is none of the multiple wind turbines operating in the noise-influencing sector; and where the output power of the at least one wind turbine reaches a rated power and then is increases by the power regulation module after limiting the output power of the at least one wind turbine, or output power of another wind turbine of the multiple wind turbines, which is not limited, reaches a rated power and then is increased by the power regulation module while limiting the output power of the at least one wind turbine, so as to compensate a power loss in limiting the output power of the at least one wind turbine.

A controller of a wind turbine is provided according to another aspect of an embodiment of the present disclosure. The controller includes a processor, and a memory storing a computer program, where the computer program when executed by the processor performs the aforementioned method for controlling noise of the multiple wind turbines.

A system for controlling noise of wind turbines is provided according to another aspect of the present disclosure, including multiple wind turbines and a farm-level controller, where the farm-level controller performs the aforementioned method, so that at least one of the multiple wind turbines performs corresponding noise control.

Based on the method and the apparatus for controlling noise of the multiple wind turbines according to the embodiments of the present disclosure, operation modes of the multiple wind turbines can be reasonably switched by delimiting the noise-influencing sectors of the multiple wind turbines. Thereby, the multiple wind turbines are controlled to meet the requirement on the noise while timely compensating a loss in power generation, and requirements on various customizations are met.

BRIEF DESCRIPTION OF THE DRAWINGS

Hereinafter drawings of embodiments are illustratively shown for detailed description. The aforementioned and other objectives, features and advantages of the embodiments of the present disclosure would be clear and characterized as follows.

DETAILED DESCRIPTION OF EMBODIMENTS

Hereinafter different exemplary embodiments are described more thoroughly with reference to the drawings.

Figure 1:
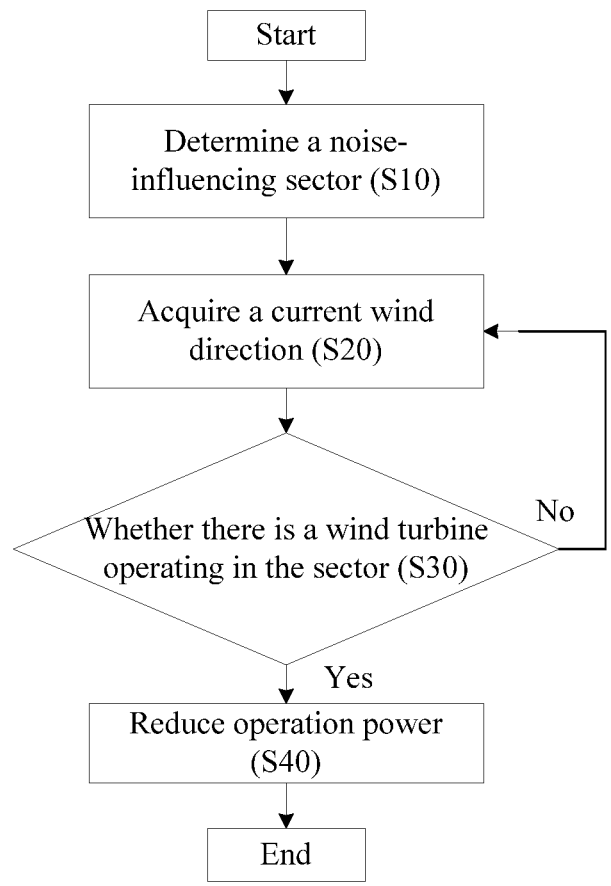
FIG. 1 is a flowchart of a method for controlling noise of multiple wind turbines according to an embodiment of the present disclosure.

FIG. 1 is a flowchart of a method for controlling noise of multiple wind turbines according to an embodiment of the present disclosure.

Reference is made to FIG. 1. In step S10, a noise-influencing sector of each of the multiple wind turbines may be determined based on positions of the multiple wind turbines and a position of a noise-influencing site.

The noise-influencing site refers to a referential site (for example, a settlement) affected by the noise of the wind turbine. Generally, a noise influence on the noise-influencing site may be a superposed result of noise influences from two or more wind turbines on the noise-influencing site.

Hereinafter determination of the noise-influencing sector is described in detail with reference to FIG. 2.

Figure 2:
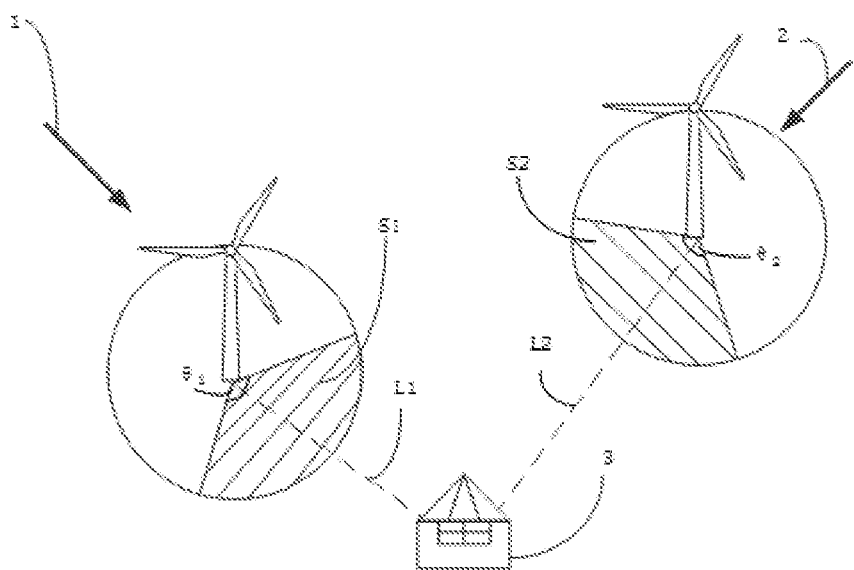
FIG. 2 is a schematic diagram for determining a noise-influencing sector of a wind turbine based on a position of the wind turbine and a position of a noise-influencing site according to an embodiment of the present disclosure.

FIG. 2 is a schematic diagram for determining a noise-influencing sector of a wind turbine based on a position of the wind turbine and a position of the noise-influencing site according to an embodiment of the present disclosure.

Based on a noise propagation theory of a wind turbine (hereinafter may be abbreviated as a turbine), a referential site in an upwind direction of the wind turbine is subjected to a minimum influence of noise, and a referential site in a downwind direction of the wind turbine is subjected to a maximum influence of noise. For example, as shown in FIG. 2, the settlement 3 is more affected by the noise of a turbine T1 under the current wind direction (as indicated by 1 in FIG. 2), in a case that the residential point 3 is located within the downwind direction of the turbine T1 (namely, the wind goes in a direction from the turbine T1 to the settlement 3). Additionally, as shown in FIG. 2, the settlement 3 is more affected by the noise of a turbine T2 under the current wind direction (as indicated by 2 in FIG. 2), in a case that the residential point 3 is located within the downwind direction of the turbine T2 (namely, the wind goes in a direction from the turbine T2 to the settlement 3). Therefore, for wind turbines and a noise-influencing site that have been determined, each noise-influencing sector for each turbine on the noise-influencing site may be determined based on the positions of each turbine and the position of the noise-influencing site.

In some embodiments, the noise-influencing sector may be a sector region. A vertex of the sector region is the position of the wind turbine. A central angle of the sector region has a predetermined angle, and is formed with an angular bisector in a direction from the wind turbine to the noise-influencing site. Namely, the position of the wind turbine is an end point of the angular bisector, which is a ray, and a direction of the ray is along a connection line starting from the position of the wind turbine to the noise-influencing site.

Reference is made to FIG. 2. A sector region S1 may be formed by taking the position of the turbine T1 as the vertex, a connection line to the residential point 3 (as line L1 shown in FIG. 2) as the angular bisector, and a predetermined angle $\theta_1$ as the central angle. The formed sector region S1 is the noise-influencing sector of the turbine T1. For example, the predetermined angle $\theta_1$ may be 60° or 90°, but is not limited thereto.

Similarly, a sector region S2 may be formed by taking the position of the turbine T2 as the vertex, a connection line to the residential point 3 (as line L2 shown in FIG. 2) as the angular bisector, and a predetermined angle $\theta_2$ as the central angle. The formed sector region S2 is the noise-influencing sector of the turbine T2. The predetermined angle $\theta_1$ and the predetermined angle $\theta_2$ may be identical or different.

Therefore, for different wind directions, in a case that each turbine operates within a range of the determined noise-influencing sector thereof (that is, a region in the downwind direction of the turbine is included in the noise-influencing sector of the turbine), noise of the corresponding turbine has a greater influence on a referential site in the range of the noise-influencing sector than a referential site out of the range of the noise-influencing sector.

Reference is made to FIG. 1 again. In step S20, the current wind direction may be acquired.

For example, a referential direction of at least one wind turbine of the multiple turbines may be acquired via a satellite positioning-and-orientation system installed on the at least one wind turbine, and the current wind direction may be acquired in real time via the satellite positioning-and-orientation system and a yaw system of the turbine.

Specifically, the referential direction of the at least one turbine (such as due north) may be acquired via the satellite positioning-and-orientation system, and the current wind direction may be acquired via the yaw system of the turbine based on the acquired referential direction. It should be noted that the above is an example, and embodiments of the present disclosure are not limited thereto.

In step S30, it may be determined whether there is at least one wind turbine of the multiple wind turbines under the current wind direction operating in the noise-influencing sector of the at least one wind turbine. For example, as described above, it may be determined whether the downwind region of the turbines is included in the respective determined noise-influencing sector under the current wind direction.

In a case that it is determined in the step S30 that the at least one wind turbine of the multiple wind turbines under the current wind direction operates in the noise-influencing sector thereof, output power of the at least one wind turbine may be limited in step S40. For example, in a case that five wind turbines of the multiple wind turbines operate in their respective noise-influencing sectors, the output power of the five wind turbines may be limited.

In a case that it is determined in the step S30 that there is none of the multiple wind turbines operating in the noise-influencing sector, the method returns to step S20 and continues to acquire the current wind direction.

In some embodiments, that the output power is limited may include following steps. A requirement on noise control at the noise-influencing site is acquired, and the requirement on noise control includes a level of a sound pressure at the noise-influencing site. The at least one wind turbine is operated in a power-limited mode corresponding to the requirement on noise control, so as to control the noise.

Specifically, aerodynamic noise of the wind turbine in operation may be represented by a level $L_\omega$ of sound power (in decibels (dB)). For a specific noise-influencing site, a noise level sensed at the noise-influencing site due to the aerodynamic noise of the turbine may be represented by the level $L_\rho$ (in decibels (dB)) of the sound pressure. For example, the maximum level of the bearable sound pressure at the noise-influencing site can be obtained by acquiring the requirement on noise control at the noise-influencing site.

Magnitude of the level of the sound pressure is related to a distance to a sound source (for example, the turbine). Generally, for the turbine and the noise-influencing site with determined positions while neglecting complex terrain factors, the higher the level of the sound power of the turbine is, the higher the level of the sound pressure at the noise-influencing site is. Therefore, the level of the sound power of the turbine may be reduced by operating the turbine in the power-limited mode, and thereby the level of the sound pressure level at the noise-influencing site is reduced.

In some embodiments, in a case that the at least one wind turbine operates in the power-limited mode, an impeller speed of the at least one wind turbine may be reduced and/or a minimum pitch angle may be increased, so that the measured level of the sound pressure at the noise-influencing site is less than or equal to a required level of the sound pressure. Those skilled in the art should appreciate that a specific power-limited mode of the present disclosure is not limited to the aforementioned manner that is determined according to the requirement on noise control. For example, the power-limited mode of the turbine may be set in advance.

In some embodiments, a degree of reducing the impeller speed and/or increasing the minimum pitch angle may be determined based on a distance between the noise-influencing site and each of the at least one wind turbine. Namely, the farther the noise-influencing site is to the wind turbine, the less the impeller speed of the wind turbine is reduced and/or the minimum pitch angle of the wind turbine is increased. Therefore, a loss in overall power generation of the multiple wind turbines is reduced as much as possible, by reducing power of the wind turbine that is farther to the noise-influencing site less.

After adjusting the impeller speed and/or the minimum pitch angel of each of the at least one wind turbine, the level of the sound pressure at the noise-influencing site may be measured, so as to determine whether a measured level of the sound pressure is less than or equal to the required level of the sound pressure at the noise-influencing site. In case of a positive determination, each turbine operates at the adjusted impeller speed and the adjusted minimum pitch angle, so as to ensure that the level of the sound pressure at the noise-influencing site in the noise-influencing sector meets the requirement.

In a case that the measured level of the sound pressure is greater than the required level of the sound pressure level, the step of reducing the impeller speed and increasing the minimum pitch angle may be repeated on the at least one wind turbine, and the level of the sound pressure at the noise-influencing site may be measured again, until the level of the sound pressure is less than or equal to the required level of the sound pressure.

In some embodiments, the output power of the at least one wind turbine reaches a rated power and is then increased, after the output power of the at least one wind turbine is limited. Or, output power of another wind turbine of the multiple wind turbines, which is not limited, reaches a rated power and is then increased, while the output power of the at least one wind turbine is limited. Thereby, a power loss in limiting the output power of the at least one wind turbine is compensated.

Herein, being after the output power of the turbine is limited may refer to that the turbine goes out of the noise-influencing sector, or does not operate in the noise-influencing sector. Namely, a downwind region of the turbine is not included in the noise-influencing sector.

For example, in a case that five wind turbines of the multiple wind turbines operate in the respective noise-influencing sector, the output power of the five wind turbines may reach a rated power and then be increased, after the five wind turbines go out of the respective noise-influencing sector. Or, output power of other wind turbines than the five wind turbines of the multiple wind turbines may reach a rated power and then be increased, while the output power of the five wind turbines is limited.

In some embodiments, that the output power is increased may include a following step. The at least one wind turbine or the another wind turbine is operated in a power-boosted mode for power compensation.

In a case that the wind turbine operates in the power-boosted mode, the impeller speed and/or the minimum pitch angle of the at least one wind turbine or the another wind turbine may be restored to a default value, and torque of a generator of the at least one wind turbine or the another wind turbine is set within a range between a respective rated value for the torque and a respective preset value for the torque, respectively, after the output power of the at least one wind turbine or the another wind turbine reaches the rated power. The respective preset value for the torque may be greater than the respective rated value for the torque.

Specifically, the impeller speed and the minimum pitch angle of each of the at least one wind turbine or the another wind turbine may be firstly reset from a current value to the default value. The default value may refer to values of the impeller speed value and the minimum pitch angle of each turbine during normal operation that is prior to performing the method for controlling noise according to the present disclosure, namely, a design value of each turbine.

In a case that the output power of each turbine reaches the rated power, since output power is directly proportional to the torque of the generator for each turbine, the torque of the generator may be increased to increase the output power of the turbine, consequently the output power can be above the rated power, so that supernumerary output power can be used to compensate for a loss in power generation during noise control in the corresponding noise-influencing sector. The preset value for the torque may be a value of the torque that enables the turbine to output the maximum power while ensuring safe operation, and the value may be set in advance. The preset value may be different for different turbines.

For example, based on an amount of the loss in power generation during the turbine operates in the power-limited mode, it may be determined which value in the range between the rated value for the torque and the preset value for the torque is to be set. Those skilled in the art can understand that a manner of compensating the amount of power generation is not limited thereto. For example, the torque of the generator may be set to be any value in the range between the rated value for the torque and the preset value for the torque, or a length of time for operating in the power-boosted mode may be set.

In some embodiments, the requirement on noise control may further include a length of time for operating in the power-limited mode and/or a time period for controlling noise. The time period for controlling noise refers to a time period in which the aerodynamic noise of the wind turbine is required to be controlled. For example, in a case that the requirement on noise control includes the time period for controlling noise, the output power of all the multiple wind turbines may be limited during the time period for controlling noise, until the time period for controlling noise ends. The step of limiting the output power may be similar to the step S40 in FIG. 1. For example, the time period for controlling noise may be a time period from 21 p.m. to next 6 a.m., but is not limited thereto.

Figure 3:
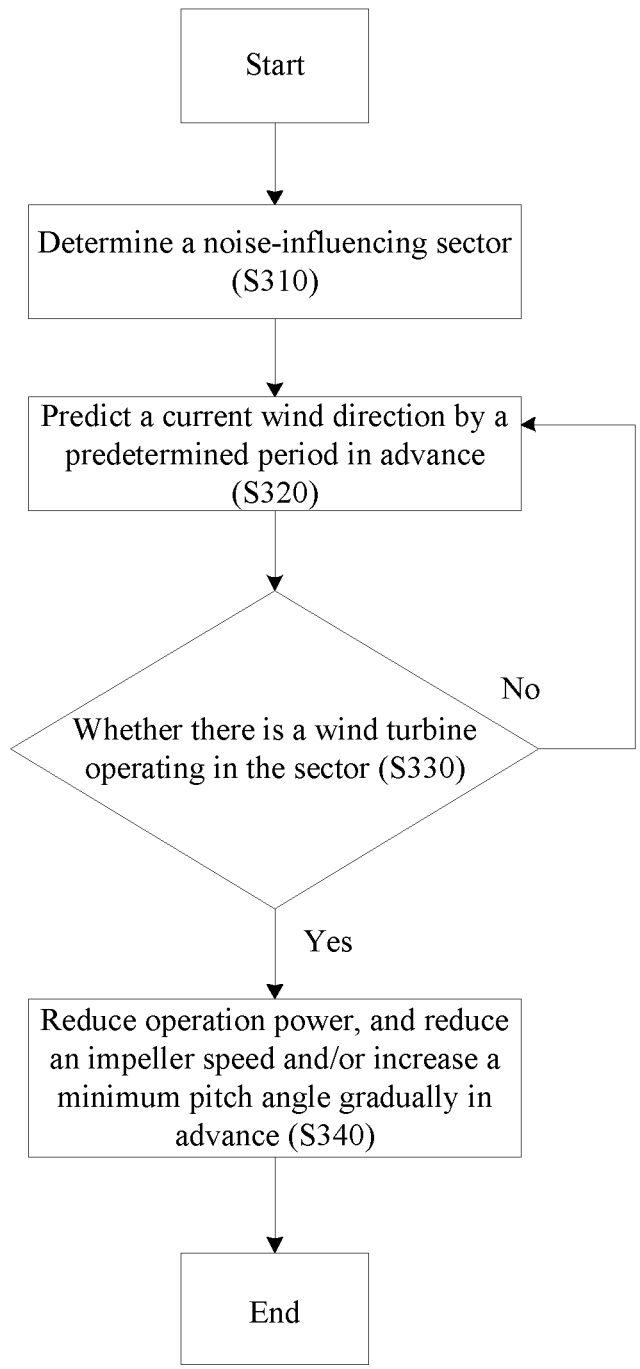
FIG. 3 is a flowchart of a method for controlling noise of multiple wind turbines according to another embodiment of the present disclosure.

FIG. 3 is a flowchart of a method for controlling noise of multiple wind turbines according to another embodiment of the present disclosure.

Reference is made to FIG. 3. According to another embodiment, step S310 is similar to step S10 of FIG. 1, and the noise-influencing sector of each of the multiple wind turbines may be determined based on the positions of the multiple wind turbines and the position of the noise-influencing site.

In step S320, the current wind direction may be predicted by a predetermined period in advance. For example, a prediction model may be established in advance by using history data, and the determined prediction model may be used to predict the current wind direction by a predetermined period (such as 5 minutes) in advance.

The step S330 is similar to the step S30 in FIG. 1. It may be determined in advance whether there is at least one wind turbine of the multiple wind turbines under the current wind direction operating in the noise-influencing sector of the at least one wind turbine.

In a case that it is determined that the at least one turbine operates in the noise-influencing sector thereof, output power of the at least one wind turbine may be limited (namely, the at least one wind turbine operates in a power-limited mode) in step S340. In case of operating in the power-limited mode, an impeller speed of the at least one wind turbine is gradually decreased in advance and/or a minimum pitch angle of the at least one wind turbine is gradually increased in advance within the predetermined period. Thereby, the measured level of the sound pressure at the noise-influencing site is less than or equal to the required level of the sound pressure level, at a current time when the predetermined period ends.

In addition, the output power of the at least one wind turbine or another wind turbine of the multiple wind turbines may further be increased (namely, the at least one wind turbine or the another wind turbine operates in a power-boosted mode) after reaching a rated power. In case of operating in the power-boosted mode, the impeller speed and/or the minimum pitch angle of the at least one wind turbine or the another wind turbine may be gradually restored in advance within the predetermined period. Thereby, the impeller speed and the minimum pitch angel are default values, at the current time when the predetermined period ends.

Therefore, smooth switching between the power-limited operation and the power-boosted operation of the wind turbine can be realized. Instability due to an instant sudden switching can be prevented, and safe operation of the turbine can be further guaranteed.

In addition, in a case that it is determined in the step S330 that there is no turbine operating in the noise-influencing sector, the method may return to the step S320 to continue predicting the current wind direction.

In addition, a corresponding turbine may be set based on a prediction result to operate in one of the power-limited operation mode and the power-boosted operation mode, in a case that the predicted wind directions shows that fluctuations of the wind directions in the future would make the turbine operate unsteadily at a border of the noise-influencing sector (for example, alternating frequently between two conditions of operating and not operating in the noise-influencing sector). Thereby, it is prevented that stability and safety of the turbine are affected by adjusting parameters back and forth within a short period of time.

In addition, it may be determined whether the current time after the predetermined period (such as 5 minutes, 10 minutes, or 60 minutes) would be within the controlling noise time period, in a case that the requirement on noise control includes the time period for controlling noise.

The output power of all the multiple wind turbine may be limited, in a case that it is determined that the current time after the predetermined period is within the time period for controlling noise. The step of limiting the output power may be similar to the aforementioned.

Figure 4:
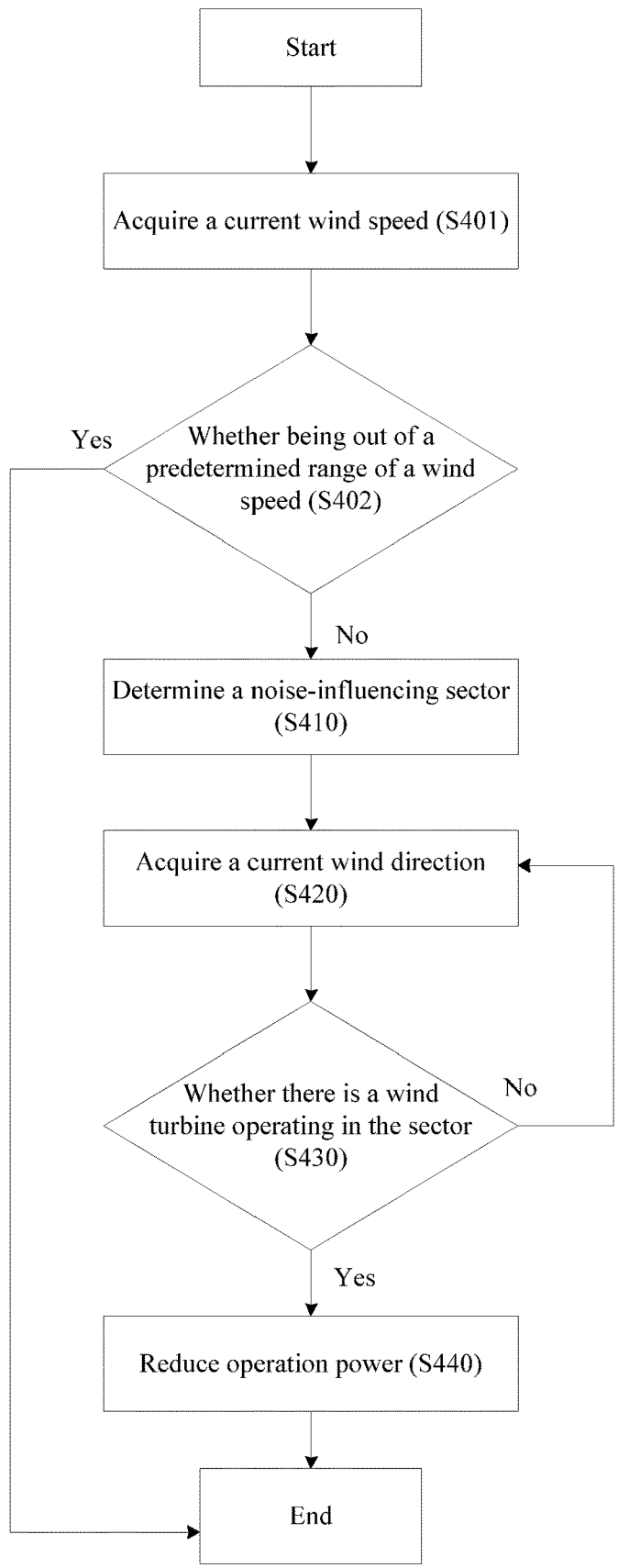
FIG. 4 is a flowchart of a method for controlling noise of multiple wind turbines according to another embodiment of the present disclosure.

FIG. 4 is a flowchart of a method for controlling noise of multiple wind turbines according to another embodiment of the present disclosure.

Reference is made to FIG. 4. A current wind speed may be acquired in step S401 before the noise-influencing sector is determined in step S410. For example, a variety of conventional methods can be used to acquire the current wind speed.

In step S402, it may be determined whether the acquired current wind speed is out of a predetermined range of a wind speed.

For example, the predetermined range of the wind speed may be a wind speed range between a first wind speed and a second wind speed. The turbine is in a variable-rotor-speed control stage in a case that the wind speed is less than the first wind speed (for example, 6 m/s). In such case, the impeller speed is low, the generated aerodynamic noise is low, and there is no need to control the noise of the turbine. Environmental noise is generally much larger than the noise generated by the turbine in a case that the wind speed is greater than the second wind speed (for example, 12 m/s), and there is no practical significance in controlling noise of the turbine.

Therefore, the wind turbine may normally operate without performing noise control in a case that it is determined in the step S402 that the current wind speed is out of the predetermined range of the wind speed. Otherwise, the method continues to perform steps S410 to S440. Herein steps S410 to S440 are similar to the steps S10 to S40 in FIG. 1, respectively.

In some embodiments, in the step S401, the predetermined prediction model as described in FIG. 3 may be used to predict the current wind speed by the predetermined period in advance.

It should be noted that no noise control is performed on the multiple wind turbines, in a case that it is determined in the step S402 that the acquired current wind speed is out of the predetermined range of the wind speed. Namely, the multiple wind turbines operate normally and a method for controlling noise is not performed, regardless whether the current time is within the time period for controlling noise and whether the wind turbine operates in the noise-influencing sector.

Figure 5:
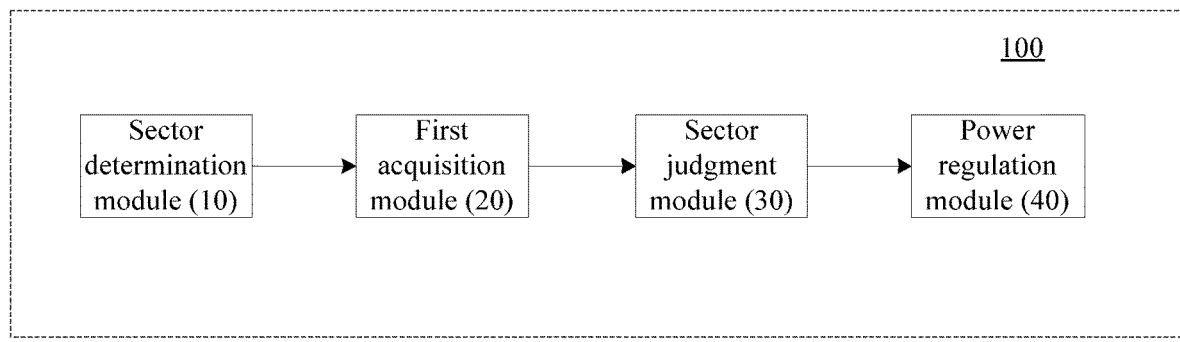
FIG. 5 is a structural block diagram of an apparatus for controlling noise of multiple wind turbines according to an embodiment of the present disclosure.

FIG. 5 is a structural block diagram of an apparatus for controlling noise of multiple wind turbines according to an embodiment of the present disclosure.

Reference is made to FIG. 5. The apparatus 100 according to the embodiment may include a sector determination module 10, a first acquisition module 20, a sector judgment module 30, and a power regulation module 40.

The sector determination module 10 may determine a noise-influencing sector of the each of the multiple wind turbines based on positions of the multiple wind turbines and a position of the noise-influencing site.

The noise-influencing site refers to a referential site (for example, a settlement) affected by the noise of the wind turbine. Generally, a noise influence on the noise-influencing site may be a superposed result of noise influences from two or more wind turbines on the noise-influencing site. The noise-influencing sector may be a sector region. A vertex of the sector region is the position of the wind turbine. A central angle of the sector region has a predetermined angle, and is formed with an angular bisector in a direction from the wind turbine to the noise-influencing site.

The first acquisition module 20 may acquire a current wind direction.

For example, the first acquisition module 20 may acquire a referential direction of the at least one wind turbine via a satellite positioning-and-orientation system installed on the al least one wind turbine of the multiple wind turbines, and acquire the current wind direction via the satellite positioning-and-orientation system and a yaw system of the turbine.

Specifically, the first acquisition module 20 may acquire the referential direction (such as due north) of the at least one wind turbine via the satellite positioning-and-orientation system, and acquire the current wind direction via the yaw system of the turbine based on the acquired referential direction. It should be noted the above is an example, and embodiments of the present disclosure are not limited thereto.

The sector judgment module 30 may determine whether there is at least one wind turbine of the multiple wind turbines under the current wind direction operating in the noise-influencing sector of the at least one wind turbine. For example, the sector judgment module 30 may determine whether a downwind region of the turbine is included in the noise-influencing sector of the turbine under the current wind direction.

In a case that the sector judgment module 30 determines that there is at least one wind turbine of the multiple wind turbines operating in the noise-influencing sector of the at least one wind turbine, the power regulation module 40 may limit the output power of the at least one wind turbine.

In a case that the sector judgment module 30 determines that there is no wind turbine operating in the noise-influencing sector, the first acquisition module 20 may continue acquiring the current wind direction.

In some embodiments, limiting the output power may include following steps. A requirement on noise control at the noise-influencing site is acquired, and the requirement on noise control includes a level of a sound pressure at the noise-influencing site. The at least one wind turbine is operated in a power-limited mode corresponding to the requirement on noise control, so as to control the noise.

In some embodiments, the power regulation module 40 may reduce an impeller speed and/or increase a minimum pitch angle of the at least one wind turbine, in a case that the at least one wind turbine operates in the power-limited mode, so that a measured level of the sound pressure is less than or equal to a required level of the sound pressure at the noise-influencing site. A degree of reducing the impeller speed and/or increasing the minimum pitch angle may be determined based on a distance between the noise-influencing site and each of the at least one wind turbine. The farther the noise-influencing site is to the wind turbine, the less the impeller speed of the wind turbine is reduced and/or the minimum pitch angle of the wind turbine is increased. A specific description of limiting the output power has been provided in the above description and is not repeated herein.

In some embodiments, the output power of the at least one wind turbine reaches a rated power and then is increased by the power regulation module 40, after limiting the output power of the at least one wind turbine. Or, output power of another wind turbine of the multiple wind turbines, which is not limited, reaches a rated power and then is increased by the power regulation module 40, while limiting the output power of the at least one wind turbine. Thereby, a power loss in limiting the output power of the at least one wind turbine is compensated.

Herein, being after the output power of the turbine is limited may refer to that the turbine goes out of the noise-influencing sector, or does not operate in the noise-influencing sector. Namely, a downwind region of the turbine is not included in the noise-influencing sector.

In some embodiments, increasing the output power may include a following step. The at least one wind turbine or the another wind turbine is operated in a power-boosted mode for power compensation.

The power regulation module may restore the impeller speed and/or the minimum pitch angle of the at least one wind turbine or the another wind turbine to a default value, and set torque of a generator of the at least one wind turbine or the another wind turbine within a range between a respective rated value for the torque and a respective preset value for the torque, respectively, after the at least one wind turbine or the another wind turbine reaches the rated power, in a case that the at least one wind turbine or the another wind turbine operates in the power-boosted mode. The respective preset value for the torque may be greater than the respective rated value for the torque. A specific description of increasing the output power has been provided in the above description and is not repeated herein.

The requirement on noise control may further include a length of time for operating in the power-limited mode and/or a time period for controlling noise.

In some embodiments, the step of acquiring the current wind direction by the first acquisition module 20 may include a following step. The current wind direction is predicted by a predetermined period in advance.

The sector judgment module 30 may determine in advance whether there is at least one wind turbine of the multiple wind turbines under the predicted wind direction operates in the noise-influencing sector thereof determined by the sector determination module 10.

In a case that the determination is positive, the power regulation module 40 may limit the output power of the at least one wind turbine (namely, the at least one wind turbine operates in a power-limited mode). In case of operating in the power-limited mode, an impeller speed of the at least one wind turbine may be gradually decreased in advance and/or a minimum pitch angle of the at least one wind turbine may be gradually increased in advance within the predetermined period. Thereby, the measured level of the sound pressure at the noise-influencing site is less than or equal to the required level of the sound pressure level, at a current time when the predetermined period ends.

The power regulation module 40 may increase the output power of the at least one wind turbine or another wind turbine of the multiple wind turbines, after the output power reaches the rated power (namely, the at least one wind turbine or the another wind turbine operates in a power-boosted mode). In case of operating in the power-boosted mode, the impeller speed and/or the minimum pitch angle of the at least one wind turbine or the another wind turbine may be gradually restored in advance within the predetermined period. Thereby, the impeller speed and the minimum pitch angel are default values, at the current time when the predetermined period ends.

Therefore, smooth switching between the power-limited operation and the power-boosted operation of the turbine can be realized. Instability due to an instant sudden switching can be prevented, and safe operation of the turbine can be further guaranteed.

In addition, the first acquisition module 20 may continue acquiring (predicting) the current wind direction, in a case that there is no turbine operating in the noise-influencing sector.

In some embodiments, the apparatus 100 may further include a time period judgment module (not shown in the figure). The time period judgment module may determine whether the current time after the predetermined period (such as 5 minutes, 10 minutes, or 60 minutes) would be within a time period for controlling noise, in a case that the requirement on noise control includes the time period for controlling noise.

For example, the power regulation module 40 reduces the output power of all the multiple wind turbines until the time period for controlling noise ends, in a case that the time period judgment module determines that the current time after the predetermined period is within the time period for controlling noise.

In some embodiments, the power regulation module 40 may reduce the impeller speed and/or increase the minimum pitch angle of each of the multiple wind turbine, so that a measured level of the sound pressure is less than or equal to a required level of sound power in the time period for controlling noise at the noise-influencing site.

In some embodiments, the apparatus 100 may further include a second acquisition module (not shown in the figure) and an operation control module (not shown in the figure). The second acquisition module may acquire a current wind speed before the sector determination module 10 determines the noise-influencing sector. An operation control module may operate all the multiple wind turbines normally and the apparatus 100 does not control the noise, in a case that the current wind speed acquired by the second acquisition module is out of a predetermined range of a wind speed.

Figure 6:
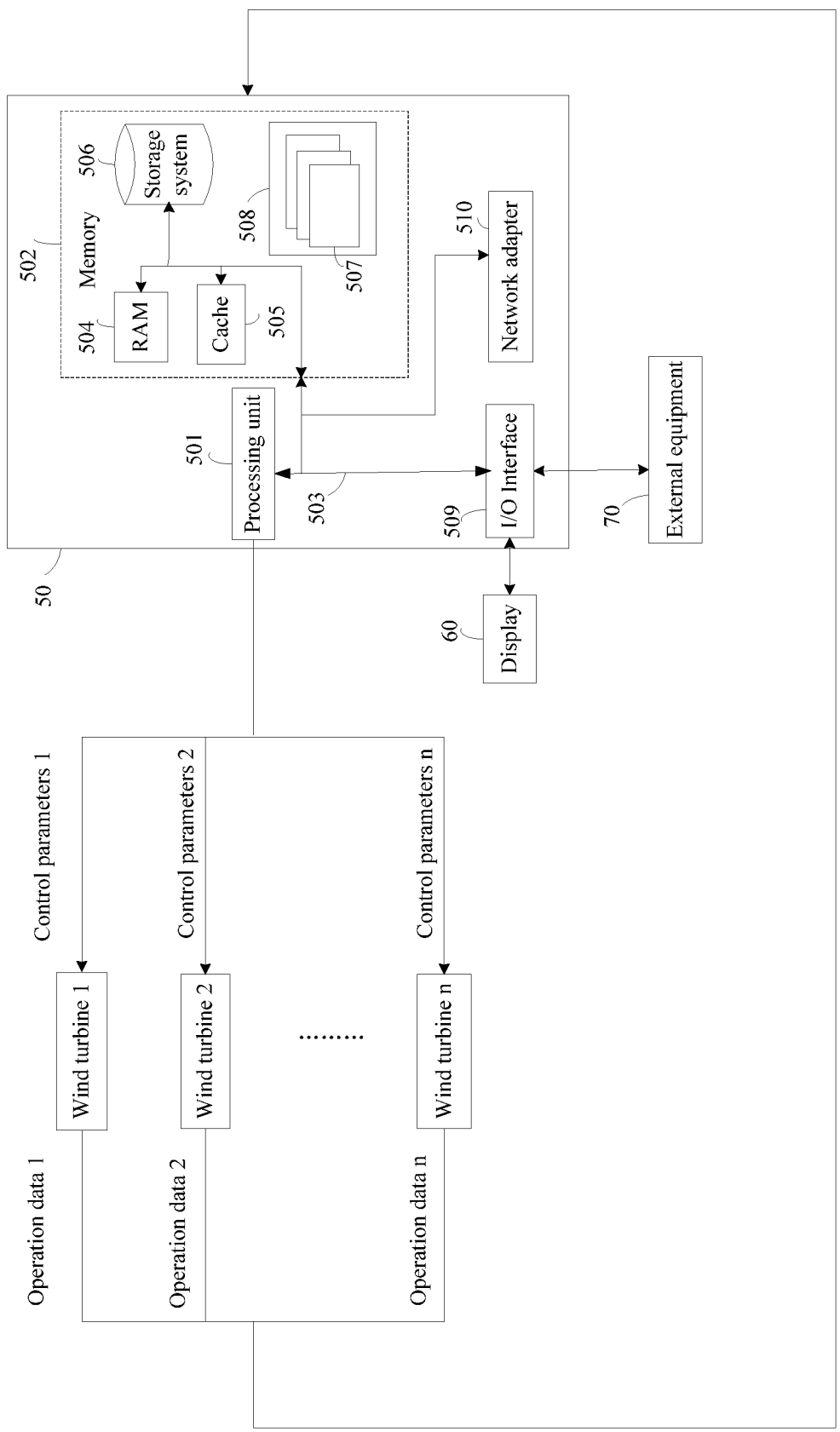
FIG. 6 is a schematic diagram of a system for controlling noise of wind turbines according to an exemplary embodiment of the present disclosure.

FIG. 6 is a schematic diagram of a system for controlling noise of wind turbines according to an exemplary embodiment of the present application.

As shown in FIG. 6, the system for controlling noise of wind turbines may include multiple wind turbines (namely, wind turbine 1, wind turbine 2, wind turbine n) and a farm-level controller 50 (such as a field-group controller). In some embodiments, components of the farm-level controller 50 may include but are not limited to: one or more processors or processing units 501, a system memory 502, and a bus 503 connecting different system components (including the system memory 502 and the processing unit 501).

The bus 503 represents one or more of multiple bus structures. For example, the bus structures include but are not limited to: an Industry Standard Architecture (ISA) bus, a Micro Channel architecture (MCA) bus, an enhanced ISA bus, a Video Electronics Standards Association (VESA) local area bus, and a Peripheral Component Interconnect (PCI) bus.

In some embodiments, the farm-level controller 50 may further include one or more computer-system-readable media. The media may be any available media accessible to the field group control device 50, including volatile and non-volatile media, removable or immovable media.

The system memory 502 may include the computer-system-readable medium in the form of a volatile memory, such as a random access memory (RAM) 504 and/or a cache memory 505. The system memory 502 may further include other removable or immovable, volatile or non-volatile computer system storage media. For example, the system memory 502 may further include a storage system 506, and the storage system 506 may be used to read and write immovable, non-volatile magnetic media (not shown in FIG. 6, commonly called a "hard disk drive"). Although not shown in FIG. 6, the system memory 502 may further include a disk drive for reading and writing a removable non-volatile disk (such as a floppy disk), and an optical disk drive for reading and writing a removable non-volatile optical disc (such as a CD-ROM, DVD-ROM, or another optical medium). In such cases, each drive may be connected to the bus 503 via one or more data media interfaces. The system memory 502 may include at least one program product, and the program product is provided with at least one program module 507 configured to perform multiple functions according to embodiments of the present disclosure.

A program/utility 508 provided with the at least one program module 507 may be stored in, for example, the system memory 502. The program module 507 includes but is not limited to: an operating system, one or more applications, other program modules and program data. In addition, each or a combination of the examples may include an implementation of a network environment. Generally, the program module 507 performs the functions and/or methods according to the embodiments described herein, so that at least one of the multiple wind turbines executes a noise control strategy determined for it.

The farm-level controller 50 may communicate with a display 60 and one or more other external devices 70 (such as a keyboard and a pointing device), and may communicate with one or more devices that enable a user to interact with the farm-level controller 50 and/or with any device that enables the farm-level controller 50 to communicate with one or more other computing devices (for example, a network card and a modem). Such communication may be realized via an input/output (I/O) interface 509. In addition, the farm-level controller 50 may communicate with one or more networks (such as a local area network (LAN), a wide area network (WAN) and/or a public network (such as the Internet)) via a network adapter 510. As shown in FIG. 6, the network adapter 510 may communicate with other modules of the farm-level controller 50 via the bus 503. It should be understood that, although not shown in FIG. 6, other hardware and/or software modules may be used in conjunction with the computer system, which include but are not limited to: a microcode, a device driver, a redundant processing unit, an external disk drive array, a RAID system, a tape drive, and a data backup storage system.

It should be noted that FIG. 6 illustratively shows a schematic diagram of a farm-level controller 50 that may be configured to implement the various embodiments of the present application. It can be appreciated by those skilled in the art that the farm-level controller 50 may be implemented by a control device that exists in a control system of a current wind turbine, may be implemented by an additional control device that is introduced, or may be implemented together by the control device that exists in the control system of the wind turbine and the additional device.

Based on the method and the apparatus for controlling noise of the multiple wind turbines according to the embodiments of the present disclosure, an operation mode of the wind turbine can be reasonably switched by delimiting the noise-influencing sector of each of the multiple wind turbines. The wind turbine is controlled to meet a restraint on the noise while compensating a loss in power generation due to the noise control. Thereby, benefits of wind farms are improved, and requirements on various customizations are met.

Although the present disclosure has been shown and described in detail with reference to the exemplary embodiments of the present disclosure, those skilled in the art should understand that the present disclosure can be modified in forms and details without departing from the spirit and scope of the present disclosure as defined by the claim.

The invention claimed is:

1. A method for controlling noise of a plurality of wind turbines, comprising:
   acquiring a current wind speed and determining that the current wind speed is within a predetermined range of wind speed;
   determining a noise-influencing sector of each of the plurality of wind turbines, based on positions of the plurality of wind turbines and a position of a noise-influencing site;
   acquiring a current wind direction;
   determining whether there is at least one wind turbine of the plurality of wind turbines under the current wind direction operating in the noise-influencing sector of the at least one wind turbine;
   limiting output power of the at least one wind turbine, in case of determining that there is at least one wind turbine of the plurality of wind turbines under the current wind direction operating in the noise-influencing sector of the at least one wind turbine, until the at least one wind turbine has left or is no longer operating in the noise-influencing sector; and
   continuing to acquire the current wind direction again, in case of determining that there is not any one wind turbine of the plurality of wind turbines under the current wind direction operating in the noise-influencing sector of the any one wind turbine;
   wherein the output power of the at least one wind turbine is increased once it reaches a rated power after limiting the output power of the at least one wind turbine, or output power of another wind turbine of the plurality of wind turbines which is not limited is increased once it reaches the rated power while limiting the output power of the at least one wind turbine, so as to compensate a power loss in limiting the output power of the at least one wind turbine; wherein the noise-influencing site is a referential site affected by noise of the plurality of wind turbines; and
   wherein the noise-influencing sector is a sector region, a vertex of the sector region is the position of the wind turbine, and a central angle of the sector region has a predetermined angle, and an angular bisector of the central angle is in a direction from the wind turbine to the noise-influencing site;
   wherein determining whether there is at least one wind turbine of the plurality of wind turbines under the current wind direction operating in the noise-influencing sector of the at least one wind turbine refers to determining whether a downwind region of the at least one wind turbine of the plurality of wind turbines is included in the noise-influencing sector of the at least one wind turbine under the current wind direction.

2. The method according to claim 1, wherein limiting the output power comprises:
   acquiring a requirement on noise control at the noise-influencing site, wherein the requirement on noise control comprises a level of a sound pressure at the noise-influencing site; and
   operating the at least one wind turbine in a power-limited mode corresponding to the requirement on noise control, so as to the control the noise.

3. The method according to claim 2, wherein the requirement on noise control further comprises a length of time for operating in the power-limited mode and/or a time period for controlling noise.

4. The method according to claim 2, wherein:
   an impeller speed of the at least one wind turbine is reduced and/or a minimum pitch angle of the at least one wind turbine is increased in a case that the wind turbine operates in the power-limited mode, so that a measured level of the sound pressure at the noise-influencing site is less than or equal to a required level of the sound pressure at the noise-influencing site; and
   a degree of reducing the impeller speed and/or increasing the minimum pitch angle for each of the at least one wind turbine is determined based on a distance between the noise-influencing site and the corresponding wind turbine of the at least one wind turbine.

5. The method according to claim 4, wherein the greater the distance between the noise-influencing site and the corresponding wind turbine is, the less the degree of reducing the impeller speed and/or increasing the minimum pitch angle for the corresponding wind turbine is.

6. The method according to claim 4, wherein increasing the output power comprises:
   operating the at least one or the another wind turbine in a power-boosted mode for power compensation.

7. The method according to claim 6, wherein in a case that the at least one wind turbine or the another wind turbine operates in the power-boosted mode:
   the impeller speed and/or the minimum pitch angle of the at least one wind turbine or the another wind turbine is restored to a default value; and
   torque of a generator of the at least one wind turbine or the another wind turbine is set within a range between a rated value for the torque and a preset value for the torque, after the output power of the at least one wind turbine or the another wind turbine reaches the rated power, wherein the preset value for the torque is greater than the rated value for the torque.

8. The method according to claim 4, wherein acquiring the current wind direction comprises:
   predicting a further time when the wind direction will align with the at least one wind turbine such that the at least one wind turbine would be operating in the noise-influencing sector; and
   adjusting the impeller speed of the at least one wind turbine over a predetermined period ending at the further time such that the measured level of the sound pressure at the noise-influenced site is less than or equal to the required level of the sound pressure level at the noise-influenced site.

9. An apparatus for controlling noise of a plurality of wind turbines, comprising:
   a processor; and a memory storing instructions, wherein the instructions when executed by the processor configure the apparatus to:

acquire a current wind speed and determine that the current wind speed is within a predetermined range of wind speed;

determine a noise-influencing sector of each of the plurality of wind turbines, based on positions of the plurality of wind turbines and a position of a noise-influencing site;

acquire a current wind direction;

determine whether there is at least one wind turbine of the plurality of wind turbines under the current wind direction operating in the noise-influencing sector of the at least one wind turbine;

limit output power of the at least one wind turbine, in case of determining that there is at least one wind turbine of the plurality of wind turbines under the current wind direction operating in the noise-influencing sector of the at least one wind turbine, until the at least one wind turbine has left or is no longer operating in the noise-influencing sector; and continue to acquire the current wind direction again, in case of determining that there is not any one wind turbine of the plurality of wind turbines under the current wind direction operating in the noise-influencing sector of the any one wind turbine;

wherein the output power of the at least one wind turbine is increased once it reaches a rated power after limiting the output power of the at least one wind turbine, or output power of another wind turbine of the plurality of wind turbines which is not limited is increased once it reaches the rated power while limiting the output power of the at least one wind turbine, so as to compensate a power loss in limiting the output power of the at least one wind turbine;

wherein the noise-influencing site is a referential site affected by noise of the plurality of wind turbines; and wherein the noise-influencing sector is a sector region, a vertex of the sector region is the position of the wind turbine, and a central angle of the sector region has a predetermined angle, and an angular bisector of the central angle is in a direction from the wind turbine to the noise-influencing site;

wherein determining whether there is at least one wind turbine of the plurality of wind turbines under the current wind direction operating in the noise-influencing sector of the at least one wind turbine refers to determining whether a downwind region of the at least one wind turbine of the plurality of wind turbines is included in the noise-influencing sector of the at least one wind turbine under the current wind direction.

10. The apparatus according to claim 9, wherein the instructions when executed by the processor further configure the apparatus to:

acquire a requirement on noise control at the noise-influencing site, wherein the requirement on noise control comprises a level of a sound pressure at the noise-influencing site; and operate the at least one wind turbine in a power-limited mode corresponding to the requirement on noise control, so as to the control the noise.

11. The apparatus according to claim 10, wherein the requirement on noise control further comprises a length of time for operating in the power-limited mode and/or a time period for controlling noise.

12. The apparatus according to claim 10, wherein:

an impeller speed of the at least one wind turbine is reduced and/or a minimum pitch angle of the at least one wind turbine is increased in a case that the wind turbine operates in the power-limited mode, so that a measured level of the sound pressure at the noise-influencing site is less than or equal to a required level of the sound pressure at the noise-influencing site; and a degree of reducing the impeller speed and/or increasing the minimum pitch angle for each of the at least one wind turbine is determined based on a distance between the noise-influencing site and the corresponding wind turbine of the at least one wind turbine.

13. The apparatus according to claim 12, wherein the greater the distance between the noise-influencing site and the corresponding wind turbine is, the less the degree of reducing the impeller speed and/or increasing the minimum pitch angle for the corresponding wind turbine is.

14. The apparatus according to claim 12, wherein the instructions when executed by the processor further configure the apparatus to:

operate the at least one or the another wind turbine in a power-boosted mode for power compensation.

15. The apparatus according to claim 14, wherein in a case that the at least one wind turbine or the another wind turbine operates in the power-boosted mode:

the impeller speed and/or the minimum pitch angle of the at least one wind turbine or the another wind turbine is restored to a default value; and torque of a generator of the at least one wind turbine or the another wind turbine is set within a range between a rated value for the torque and a preset value for the torque, after the output power of the at least one wind turbine or the another wind turbine reaches the rated power, wherein the preset value for the torque is greater than the rated value for the torque.

16. The apparatus according to claim 12, wherein the instructions when executed by the processor further configure the apparatus to:

predict a further time when the wind direction will align with the at least one wind turbine such that the at least one wind turbine would be operating in the noise-influencing sector; and adjust the impeller speed of the at least one wind turbine over a predetermined period ending at the further time such that the measured level of the sound pressure at the noise-influenced site is less than or equal to the required level of the sound pressure level at the noise-influenced site.

* * * * *